United States Patent [19]

Terazawa et al.

[11] 4,096,489

[45] Jun. 20, 1978

[54] ELECTROSTATIC-RECORDING GAS DISCHARGE DEVICE WITH IMPROVED SCANNING STABILITY

[75] Inventors: Yoshizumi Terazawa; Takashi Kitagawa; Takanori Tanaka; Kouji Aono, all of Tokyo, Japan

[73] Assignee: Nippon Electric Company, Ltd., Tokyo, Japan

[21] Appl. No.: 716,745

[22] Filed: Aug. 23, 1976

[30] Foreign Application Priority Data

Aug. 26, 1975 Japan .................................. 50-103290

[51] Int. Cl.² .......................................... G03G 19/00
[52] U.S. Cl. .................................... 346/158; 346/155
[58] Field of Search ............... 346/153, 155, 165, 158, 346/161

[56] References Cited

U.S. PATENT DOCUMENTS

| | | | |
|---|---|---|---|
| 3,458,752 | 7/1969 | Stowell | 346/158 |
| 3,551,213 | 12/1970 | Boyle | 346/158 |
| 3,673,599 | 6/1972 | Tagawa | 346/158 |
| 3,750,190 | 7/1973 | Ohkubo | 346/153 |
| 3,757,351 | 9/1973 | Simms | 346/158 |
| 3,870,257 | 3/1975 | Ohkubo | 358/300 |

*Primary Examiner*—Jay P. Lucas
*Attorney, Agent, or Firm*—Sughrue, Rothwell, Mion, Zinn and Macpeak

[57] ABSTRACT

An electrostatic-recording gas discharge device for use in an electronic printing device, a facsimile receiver, and the like, is provided with auxiliary discharge electrodes connected to respective voltage inducing electrodes for preventing a detrimental discharge from being caused at the voltage inducing electrodes.

6 Claims, 3 Drawing Figures

ELECTROSTATIC-RECORDING GAS DISCHARGE DEVICE WITH IMPROVED SCANNING STABILITY

BACKGROUND OF THE INVENTION

This invention relates to an electrostatic-recording gas discharge device for use in an electronic printing device, a facsimile receiver, and the like.

A phenomenon is known as an ionization-coupling action, in which the application of a voltage between two electrodes placed in a gas causes a gas discharge therebetween, then the firing voltage is lowered for another two electrodes placed in the close vicinity of the former two electrodes. A discharge tube is also known, which includes a plurality of cathodes (scanning electrodes) connected to each other in a suitable manner and an anode (an opposing electrode) opposed thereto, and in which a discharge is successively shifted in a given direction from one scanning electrode to another in response to electric pulse signals due to the aforesaid phenomenon.

This discharge tube has as its principal applications a discharge counter tube adapted to count pulse signals and a display device utilizing a glow discharge.

The electrostatic recording device utilizing the aforesaid phenomenon is proposed by Toshio Ohkubo and others in U.S. Pat. No. 3,750,190 and U.S. Pat. No 3,870,257. These proposals are based on the shift of discharge from one scanning-opposing electrode pair to another caused by the change in gas conductivity. Thus, in case a plurality of electrodes termed as voltage inducing electrodes are arranged in respective discharge spaces, then potentials in the spaces are successively induced at the electrodes.

Potentials at the voltage inducing electrodes are several hundred volts higher than the scanning electrode potential, so that connections of recording stylus electrodes to the respective voltage inducing electrodes bring about scanning pulse output voltages of several hundred volts. Thus, the scanning-pulse-output voltage is then applied to a dielectric layer on an electrostatic recording medium contiguous to the recording stylus electrodes, while a negative video signal voltage is applied to the back surface of the recording medium, thereby achieving the desired recording.

However, this electrostatic recording device suffers from a disadvantage that if there is a defect in the dielectric layer on the electrostatic recording medium, then a negative video signal voltage will be applied to the voltage inducing electrodes through the recording stylus electrodes, with the result that a detrimental discharge is caused between the voltage inducing electrodes and the opposing electrode, and consequently scanning is disturbed.

SUMMARY OF THE INVENTION

It is an object of the present invention to provide an electrostatic-recording gas discharge device which avoides a detrimental discharge and hence the resulting disturbance in scanning.

According to the present invention, there is provided a gas discharge device, in which a plurality of scanning electrodes having voltage inducing electrodes and a first opposing electrode opposed thereto are placed within a hermetically sealed envelope having at least one kind of gas filled therein, while recording stylus electrodes connected to the respective voltage inducing electrodes are placed outside the sealed envelope, and in addition there are provided auxiliary discharge electrodes connected to the respective voltage inducing electrodes and a second opposing electrode opposed thereto for preventing a detrimental discharge from being caused at the voltage inducing electrodes.

The gas discharge device according to the present invention includes, besides voltage inducing electrodes and their opposing electrode such as used in the invention by T. Ohkubo and others in USP at Nos. 3,750,190 and 3,870,257, auxiliary discharge electrodes connected to respective voltage inducing electrodes, and an electrode opposed to the auxiliary discharge electrodes, which are placed in a space independent of the discharge scanning, thereby allowing occurrence of a detrimental discharge in the aforesaid independent space to obtain stable scanning.

According to the present invention, there is provided an electrostatic-recording gas discharge device which is free of time-consuming adjustment, simple in construction and less costly to manufacture, and in which the above-mentioned detrimental discharge is isolated. A stable scanning is thus achieved without resorting to mechanical means.

BRIEF DESCRIPTION OF THE DRAWINGS

These and other objects and features of the present invention will be better understood from a reading of the following description taken in conjunction with the accompanying drawings, in which.

DESCRIPTION OF THE PREFERRED EMBODIMENT

Figure 1:
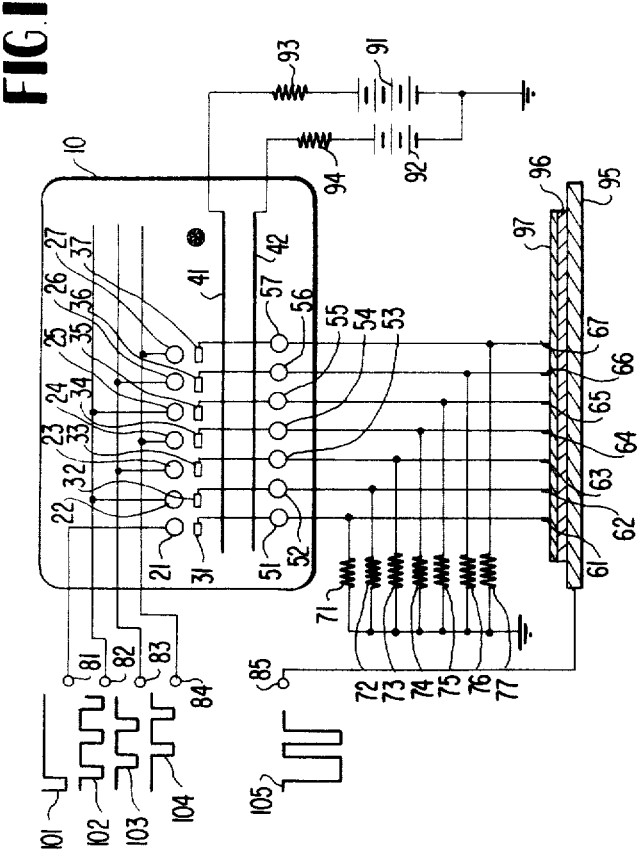
FIG. 1 shows an arrangement of an electrostatic recording device embodying the present invention.

Referring to FIG. 1, there is shown a hermetically sealed envelope 10, in which one or a mixture of hydrogen, helium, neon, argon, krypton, xenon, mercury and the like is filled. Placed in the envelope 10 are scanning electrodes 21, 22, 23, 24, 25, 26, 27, . . . voltage inducing electrodes, 31, 32, 33, 34, 35, 36, 37, . . . corresponding thereto, and a first opposing electrode 41. The scanning electrode 21 is connected to a terminal 81, while every third one of the other scanning electrodes 22 and up are commonly connected to terminals 82, 83 and 84, respectively. When a voltage of 400 V, for instance, is applied to the first opposing electrode 41 through a ballast resistance 93 from a DC power supply 91, with a starting pulse 101 of 0 volt in ON state and 100 volts in OFF state being applied to the terminal 81, and thereafter three-phase pulses 102, 103 and 104 having the same voltage level are applied to terminals 82, 83 and 84, then a discharge first takes place at the scanning electrode 21, so that the discharges are successively shifted from one scanning electrode to another, i.e., from left to right, according to a principle similar to that of a double-pulse counter tube.

As a result, a voltage approximately the firing voltage is developed at the voltage inducing electrodes 31 and up, and in turn, applied to a dielectric layer 97 on an electrostatic recording sheet 96 by means of recording stylus electrodes 61, 62, 63, 64, 65, 66, 67, . . . Shunt resistors 71, 72, 73, 74, 75, 76, . . . which ground the respective recording stylus electrodes 61 and up lower the leak-voltage between the recording stylus electrodes and shorten the fall time of output pulses at the recording stylus electrodes. On the other hand, a negative video signal 105 is applied through a terminal 85 to the back surface of the electrostatic recording sheet 96 by means of a backing electrode 95. When the absolute value of the video signal voltage is set at a value less than a threshold voltage for electrostatic recording, i.e., about 350 V, then an electrostatic latent image is formed on the dielectric layer 97 only when the voltages are applied to the both surfaces of the electrostatic recording sheet 96 at the same time, and thus latent images commensurate to the video signal 105 are successively formed from left to right.

The electrostatic recording sheet 96 is fed in a direction perpendicular to the plane of FIG. 1, so that the latent images are formed on the entire surface of the sheet 96, followed by development and fixation as used in the ordinary electrostatic recording, thus completing the recording process.

However, upon recording, if insulation defects such as pin holes or dielectric breakdowns are present in the dielectric layer 97 on the recording sheet 96 in a position contiguous to one of the recording stylus electrodes, then a negative video signal voltage is applied to the recording stylus electrode from the backing electrode 95 through residual resistance in the recording sheet 96. For instance, when the negative video signal voltage is applied to the recording stylus electrode 61, the potential on the voltage inducing electrode 31, connected to the recording stylus electrode 64 is lowered to a value below 0 volt. When the potential at the electrode 34 is lowered to a value less than approximately −50V, a discharge is developed between the first opposing electrode 41 and the voltage inducing electrode 34. This discharge stops the scanning according to the shifting of a normal discharge, while a new shifting of a discharge is commenced at the scanning electrode 24 which corresponds to the voltage inducing electrode 31, so that scanning is disturbed.

To avoid this shortcoming, auxiliary discharge electrodes 51, 52, 53, 54, 55, 56, 57, . . . connected to the respective voltage inducing electrodes 31 and up are positioned in spaced relation from the discharge scanning spaces, and a second opposing electrode 42 is positioned in opposing relation thereto, so that a discharge may be developed between the auxiliary discharge electrode 51 and the second opposing electrode 42, before the potential at the voltage inducing electrode 34 lowers to approximately −50 V. As a result, the potentials on the voltage inducing electrodes are prevented from lowering to approximately −50 V due to the constant voltage characteristics of the gas discharge. This triggers a discharge between the voltage inducing electrodes and the first opposing electrode 41, thus insuring normal shifting of the discharge and preventing any disturbance in scanning.

To preclude the discharge between the second opposing electrode 42 and the auxiliary discharge electrodes 51 and up in a normal case where the recording stylus electrodes are not contiguous to the above-mentioned insulation defects in the dielectric layer 97, a voltage on a DC power supply 92 connected by way of a ballast resistor 94 to the second opposing electrode 42 should preferably be lower than the voltage on the first opposing electrode 41. The firing voltage between the auxiliary discharge electrodes 51 and up and the second opposing electrode 42 should be lower than the discharge starting voltage between the first opposing electrode 41 and the voltage inducing electrode 31 and up. To meet the aforesaid requirement, the spacings between the electrodes arranged in opposing relation should be suitably selected. Alternatively, the auxiliary discharge electrodes 51 and up should be made of a material having a large secondary electron emitting ratio.

Meanwhile, the auxiliary discharge electrodes 51 and up and the second opposing electrode 42 may be placed in the hermetically sealed envelope 10, which also houses the first opposing electrode 41 and the like or, in the alternative, may be placed in another hermetically sealed envelope. In the case of a discharge scanning mechanism of a double pulse counter tube as has been described thus far, it was found that a scanning pulse duration may be decreased to 5 microseconds, and there may be obtained a main scanning speed of about 26,000 lines per minute for the width of a JIS-B6 format (Japanese Industrial Standard) and a main scanning speed of about 16,000 lines per minute for the width of a JIS-A4 format. In addition, a single pulse decatron discharge scanning mechanism utilizing an ionization-coupling action may be applied to the gas discharge device according to the present invention.

In addition, the scanning electrode should not necessarily be selected as a cathode, nor should the opposing electrode be necessarily selected as an anode. Discharge may be scanned even if these polarities are reversed and, in addition, the polarity of the scanning pulse voltage is positive.

For the practical fabrication of the discharge device according to the present invention, there may be used an ordinary electron-tube fabricating method in which respective electrodes are supported by lead wires provided in a glass bulb or by supporting members made of a metal or an insulating material.

Figure 2:
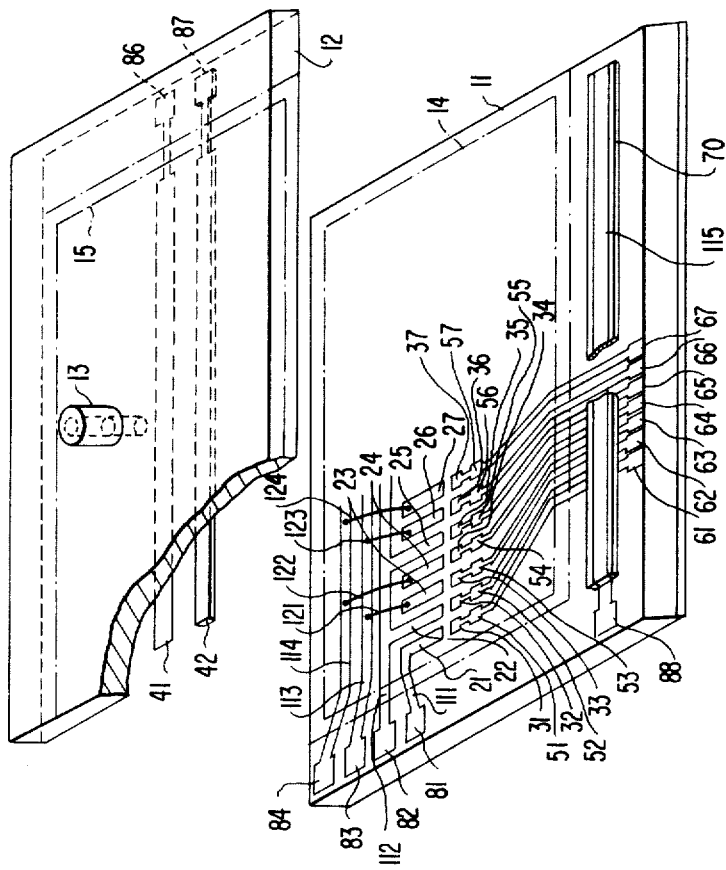
FIG. 2 is a perspective view of an arrangement of the device according to the present invention.

As can be seen from FIG. 2, the integrated circuit fabricating techniques such as vacuum-evaporation, photo-etching, electroplating and the like can be used to provide scanning electrodes 21, 22, 23, 24, 25, 26, 27, . . . , voltage inducing electrodes 31, 32, 33, 34, 35, 36, 37, . . . , auxiliary discharge electrodes 51, 52, 53, 54, 55, 56, 57, . . . , recording stylus electrodes 61, 62, 63, 64, 65, 66, 67, . . . , terminals 81, 82, 83, 84, 85 and lead wires 111, 112, 113, 114. The scanning electrodes 23, 24, 26, 27 . . . which are not directly connected to lead wires 113 and 114 according to an ultrasonci bonding technique by using wires 121, 122, 123, 124, . . . The shunt resistors consist of a resistance layer 70 made of a paint having a suitable electric resistance and an electroconductive layer 115 made of an electroconductive pain and the like.

The shapes of the auxiliary discharge electrodes 51 and up should not necessarily be those shown in the drawing, but a part of lead wires connecting the voltage inducing electrodes 31 and up to the recording stylus electrodes 61 and up may be used intact, without changing the shapes.

Screen-printed on the insulating plate 12 made of ceramic or glass and provided with an evacuating pipe 13 are a first opposing electrode 41 and its terminal 86 arranged in opposing relation to the scanning electrodes 21 and up and a second opposing electrode 42 and its terminal 87 arranged in opposing relation to the auxiliary discharge electrodes 51 and up. The second opposing electrode 42 has a relatively large thickness to provide a narrow discharge gap for lowering the discharge starting voltage. Insulating plates 11 and 12 are sealed with a sealing material such as sealing glass along the sealing portions about the perimeters of plates 11 and 12. Then, internal air is evacuated from the envelope 5 through the evacuating pipe 13, after which a given kind of a gas is filled therein.

With this embodiment, the scanning electrodes 21 and up, the first opposing electrode 41, auxiliary discharge electrodes 51 and up, and the second opposing electrode 42 are linearly aligned. However, these may be arranged in a circular pattern or on a plurality of lines.

Figure 3:
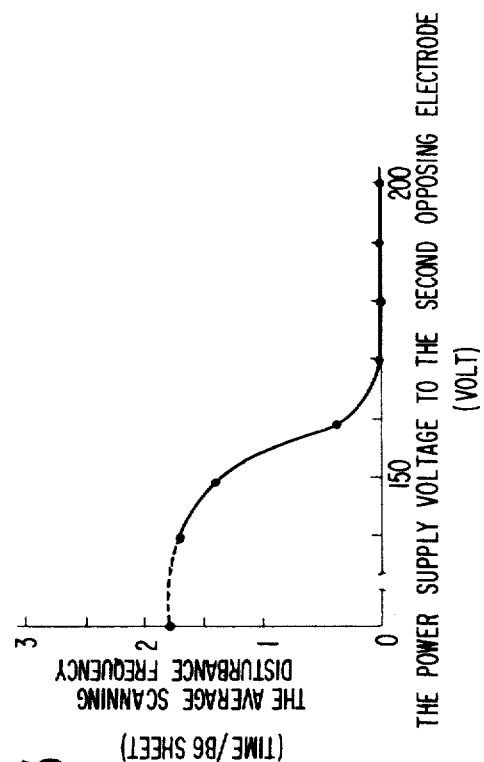
FIG. 3 is a graphical representation of the results obtained by the gas discharge device according to the present invention.

FIG. 3 illustrates the relationship between the average frequency of the scanning disturbance and the power supply voltage to be supplied to the second opposing electrode, when scanning a recording sheet of a JIS-B6 format according to the gas discharge device of the present invention. A voltage at the power supply 92 to be supplied to the second opposing electrode 42 is represented by the abscissa, while the average frequency N of scanning disturbance is represented by the ordinate. A power supply voltage lower than 140 V leads to an average scanning disturbance frequency of about 1.8 times per sheet. On the other hand, a power supply voltage of over 180 V completely eliminates the disturbance. In this manner, extremely stable scanning is achieved owing to the auxiliary discharge electrodes and the opposing electrodes which are of a simple construction. For the data represented in FIG. 3, the voltage at the power supply 91 supplying to the first opposing electrode 41 was set at about 400 V, while the video signal fed to the backing electrode 95 was set at −350 V.

What is claimed is:

1. An electrostatic-recording gas discharge device comprising:
   a plurality of scanning electrodes arranged at a given spacing;
   a plurality of voltage inducing electrodes arranged in opposing relation to said scanning electrodes;
   at least one first opposing electrode arranged in opposing relation to said scanning-electrodes;
   a hermetically sealed envelope housing all of said voltage inducing electrodes, said scanning electrodes and said first opposing electrode and having one or more kinds of gases filled therein;
   a plurality of recording stylus electrodes located outside said envelope and electrically connected to said voltage inducing electrode;
   a plurality of auxiliary discharge electrodes which are electrically connected to said voltage inducing electrodes; and
   at least one second opposing electrode arranged in opposing relation to said auxiliary discharge electrodes, said second opposing electrode and said auxiliary discharge electrodes permitting a discharge between said auxiliary discharge electrodes and said second opposing electrode in a position spaced apart from said voltage inducing electrodes and said first opposing electrode before a discharge takes place between said voltage inducing electrodes and said first opposing electrode due to a variation in potentials of said recording stylus electrodes.

2. An electrostatic-recording gas discharge device as set forth in claim 1, wherein the firing voltage between said second opposing electrode and said auxiliary discharge electrodes is lower than the firing voltage between said first opposing electrode and said voltage inducing electrodes.

3. An electrostatic-recording gas discharge device as set forth in claim 1, wherein said second opposing electrode is connected to a voltage supply means for supplying a voltage lower than the voltage of said first opposing electrode.

4. In an electrostatic-recording gas discharge device of the type comprising a plurality of scanning electrodes arranged at a given spacing, a plurality of voltage inducing electrodes arranged in opposing relation to said scanning electrodes, at least one first opposing electrode arranged in opposing relation to said scanning electrodes, a hermetically sealed envelope housing all of said voltage inducing electrodes, said scanning electrodes and said first opposing electrode and having one or more kinds of gases filled therein, a plurality of recording stylus electrodes located outside said envelope and electrically connected to said voltage inducing electrodes, the improvement comprising:
   a plurality of auxiliary discharge electrodes which are electrically connected to said voltage inducing electrodes; and
   at least one second opposing electrode arranged in opposing relation to said auxiliary discharge electrodes, said second opposing electrode and said auxiliary discharge electrodes permitting a discharge between said auxiliary discharge electrodes and said second opposing electrode in a position spaced apart from said voltage inducing electrodes and said first opposing electrode before a discharge takes place between said voltage inducing electrodes and said first opposing electrode due to a variation in potentials of said recording stylus electrodes.

5. An electrostatic-recording gas discharge device as set forth in claim 4, wherein the firing voltage between said second opposing electrode and said auxiliary discharge electrodes is lower than the firing voltage between said first opposing electrode and said voltage inducing electrodes.

6. An electrostatic-recording gas discharge device as set forth in claim 4, wherein said second opposing electrode is connected to a voltage supply means for supplying a voltage lower than the voltage of said first opposing electrode.

* * * * *